(12) United States Patent
Lobete et al.

(10) Patent No.: US 11,983,647 B2
(45) Date of Patent: May 14, 2024

(54) METHOD AND APPARATUS FOR OPERATING AN ELECTRONIC DEVICE BASED ON A DECISION-MAKING DATA STRUCTURE USING A MACHINE LEARNING DATA STRUCTURE

(71) Applicant: SAMSUNG ELECTRONICS CO., LTD., Suwon-si (KR)

(72) Inventors: Daniel Ansorregui Lobete, Staines (GB); Karthikeyan Palavedu Saravanan, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 336 days.

(21) Appl. No.: 16/468,597

(22) PCT Filed: Dec. 14, 2017

(86) PCT No.: PCT/KR2017/014672
§ 371 (c)(1),
(2) Date: Jun. 11, 2019

(87) PCT Pub. No.: WO2018/110985
PCT Pub. Date: Jun. 21, 2018

(65) Prior Publication Data
US 2019/0318254 A1    Oct. 17, 2019

(30) Foreign Application Priority Data

Dec. 15, 2016 (GB) ...................... 1621347

(51) Int. Cl.
*G06N 5/045* (2023.01)
*G06N 20/00* (2019.01)

(52) U.S. Cl.
CPC ............. *G06N 5/045* (2013.01); *G06N 20/00* (2019.01)

(58) Field of Classification Search
CPC ............................... G06N 5/045; G06N 20/00
See application file for complete search history.

(56) References Cited

U.S. PATENT DOCUMENTS 8,347,384 B1 * 1/2013 Preston ............... H04L 67/1097
726/23
9,069,737 B1 6/2015 Kimotho et al.
(Continued)

FOREIGN PATENT DOCUMENTS

GB      2502300 A    11/2013

OTHER PUBLICATIONS

Q-Learning Based Power Control Algorithm for D2D Communication (Shiwen Nie; Zhiqiang Fan; Ming Zhao; Xinyu Gu; Lin Zhang) taken from https://ieeexplore.ieee.org/document/7794793 (Year: 2016).*

(Continued)

*Primary Examiner* — Alexey Shmatov
*Assistant Examiner* — Robert Bejcek, II
(74) *Attorney, Agent, or Firm* — Sughrue Mion, PLLC

(57) ABSTRACT

A method for a first electronic device comprises generating a decision-making data structure using a machine learning data structure; transmitting, to a second electronic device, the decision-making data structure; receiving, from the electronic device, result data regarding a result of performing a selected action selected from the decision-making data structure; and updating the machine learning data structure using the result data.

20 Claims, 10 Drawing Sheets

(56) References Cited

U.S. PATENT DOCUMENTS

| | | | |
|---|---|---|---|
| 2009/0187641 | A1 | 7/2009 | Li et al. |
| 2010/0114803 | A1 | 5/2010 | Moon et al. |
| 2013/0080358 | A1 | 3/2013 | Newnham et al. |
| 2013/0176146 | A1 | 7/2013 | Dusparic et al. |
| 2013/0210480 | A1* | 8/2013 | Pollington ............ H04W 88/02 455/550.1 |
| 2015/0365871 | A1* | 12/2015 | Hu ........................ H04W 16/14 370/331 |

OTHER PUBLICATIONS

An Algorithm for Distributed Reinforcement Learning in Cooperative Multi-Agent Systems (Martin Lauer, Marin Riedmiller) taken from http://citeseerx.ist.psu.edu/viewdoc/summary?doi=10.1.1.2.772 (Year: 2000).*

Q-Learning Based Power Control Algorithm for D2D Communication (Shiwen Nie; Zhiqiang Fan; Ming Zhao; Xinyu Gu; Lin Zhang) retrieved from <https://ieeexplore.ieee.org/document/7794793> (Year: 2016).*

An Algorithm for Distributed Reinforcement Learning in Cooperative Multi-Agent Systems (Martin Lauer, Marin Riedmiller) retrieved from <http://citeseerx.ist.psu.edu/viewdoc/summary?doi=10.1.1.2.772> (Year: 2000).*

Distributed Q-learning for energy harvesting Heterogeneous Networks (Miozzo) retrieved from https://ieeexplore.IEEE.org/abstract/document/7247475> (Year: 2015).*

"Flags", retrieved via Internet Archive on Mar. 7, 2015, retrieved from <https://web.archive.org/web/20150307205822/http://cs.uky.edu/~keen/115/reading/flags-py.html>, pp. 1-2 (Year: 2015).*

Sandholm et al. Multiagent reinforcement learning in the Iterated Prisoner's Dilemma. BioSystems 37 (1996) 147-166 (Year: 1996).*

Wilson, Stewart W. Explore/Exploit Strategies in Autonomy. 1996. (Year: 1996).*

Communication dated Jun. 15, 2017, isseud by the United Kingdom Patent Office in counterpart United Kingdom Application No. GB1621347.2.

Wikipedia, "Q-learning", May 2, 2019, https://en.wikipedia.org/wiki/Q-learning, 6 pages total.

Watkins, C. and Dayan, P., "Technical Note Q-Learning", 1992, Machine Learning, 8, p. 279-292, 14 pages total.

Martin, V., et al., "Q-Learning based control algorithm for HTTP adaptive streaming", Dec. 2015, Visual Communications and Image Processing (VCIP), 4 pages total.

Search Report dated Apr. 4, 2018, issued by the International Searching Authority in International Application No. PCT/KR2017/014672 (PCT/ISA/210).

Written Opinion dated Apr. 4, 2018, issued by the International Searching Authority in International Application No. PCT/KR2017/014672 (PCT/ISA/237).

Communication dated Oct. 9, 2019, issued by the European Patent Office in counterpart European Application No. 17881319.2.

Nie, S., et al., "Q-Learning Based Power Control Algorithm for D2D Communication", Sep. 4, 2016, 2016 IEEE 27th Annual IEEE International Symposium on Personal, Indoor and Mobile Radio Communications-(PIMRC): MAC & Cross-Layer Design, XP033035425, 6 pages total.

Mllaverde, B. C., et al., "InRout—A QpS aware route selection algorithm for industrial wireless sensor networks", 2012, Ad Hoc Networks, vol. 10, No. 3., XP028351329, p. 458-478, 21 pages total.

Cruz, D. L., et al., "Path planning of multi-agent systems in unknown environment with neural kernel smoothing and reinforcement learning", 2017, Neurocomputing, vol. 233, XP029902180, p. 34-42, 9 pages total.

Bressan, S., et al., "Exploiting Local Popularity to Prune Routing Indices in Peer-to-Peer Systems", Aug. 22, 2005, Proceedings of the 16th International Workshop on Database and Expert Systems Applications (DEXA'05), XPO10835688, p. 790-795, 6 pages total.

Communication dated Apr. 23, 2021 by the European Patent Office in counterpart European Patent Application No. 17881319.2.

Communication dated May 15, 2023 by the European Patent Office for EP Patent Application No. 17881319.2.

Office Action dated May 24, 2023 by the Korean Patent Office in corresponding KR Patent Application No. 10-2019-7020085.

* cited by examiner

[Fig. 1]
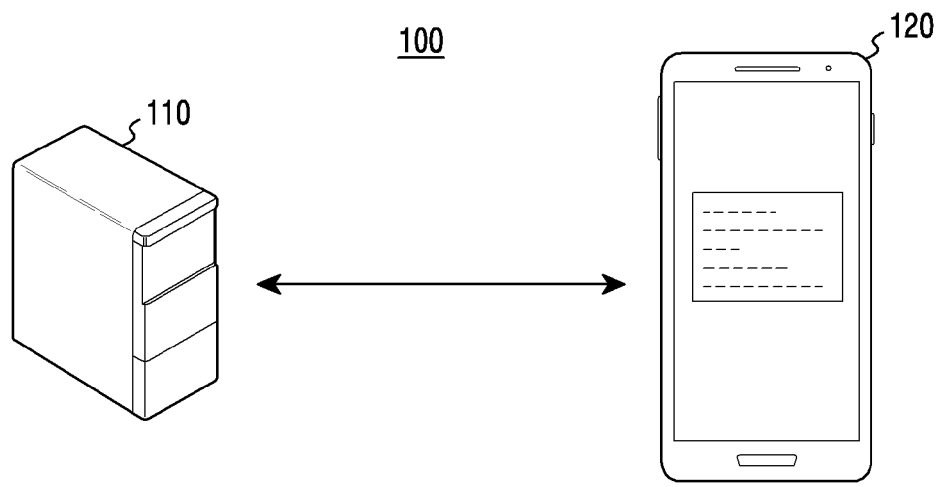
[Fig. 2]
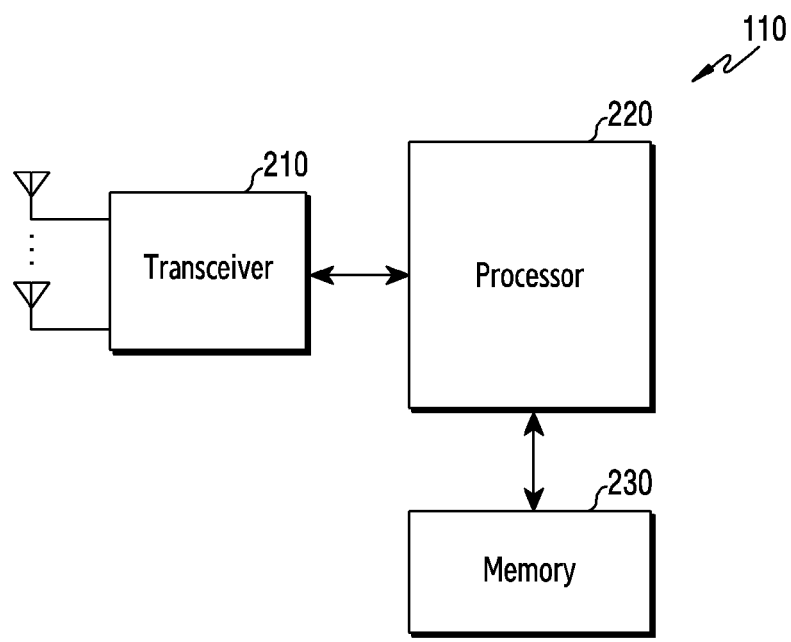

[Fig. 3]
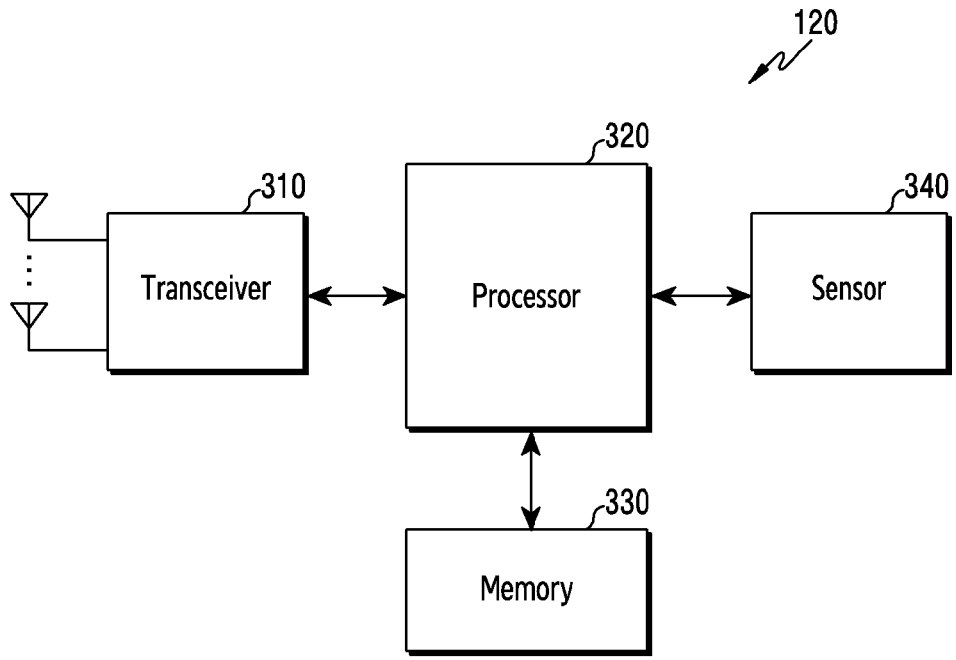
[Fig. 4]
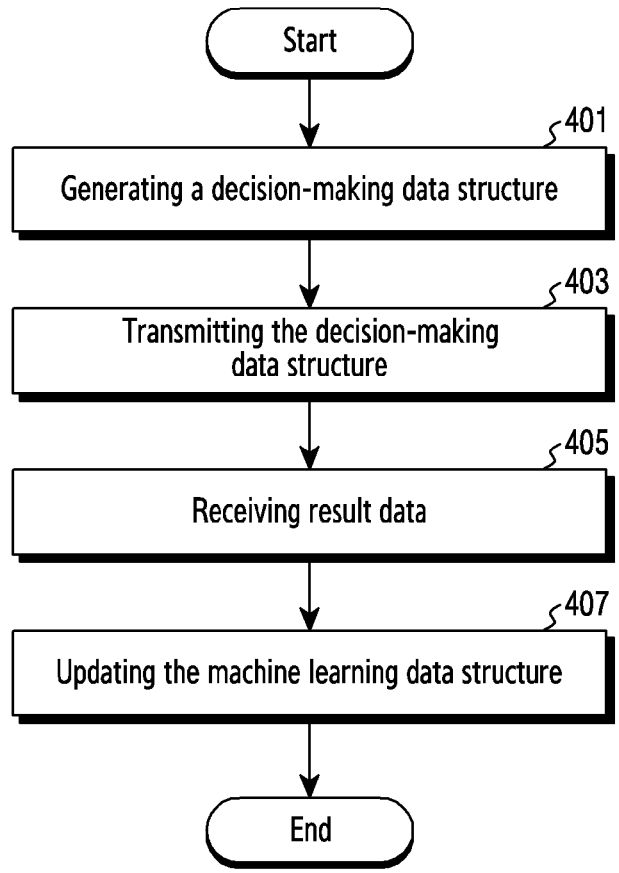

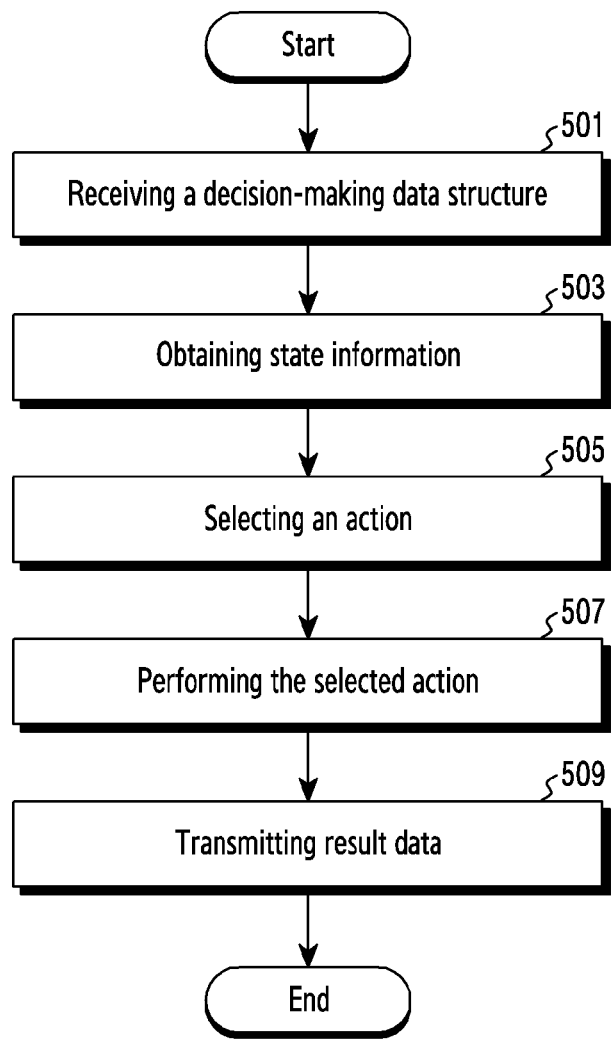

[Fig. 6]
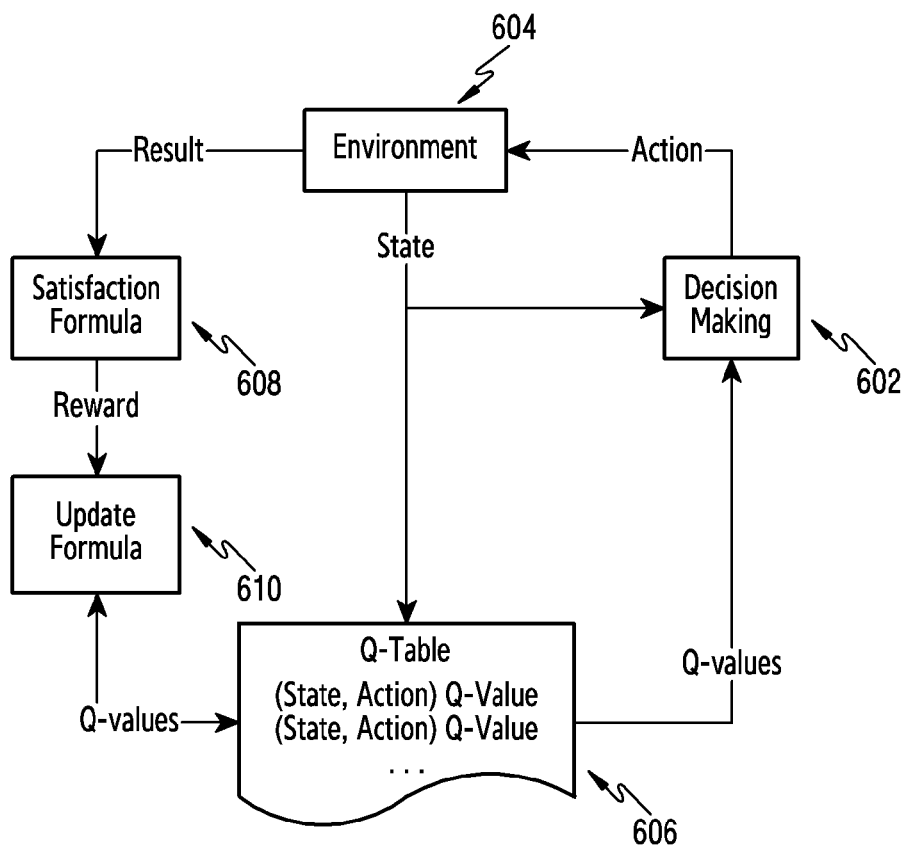

[Fig. 7]
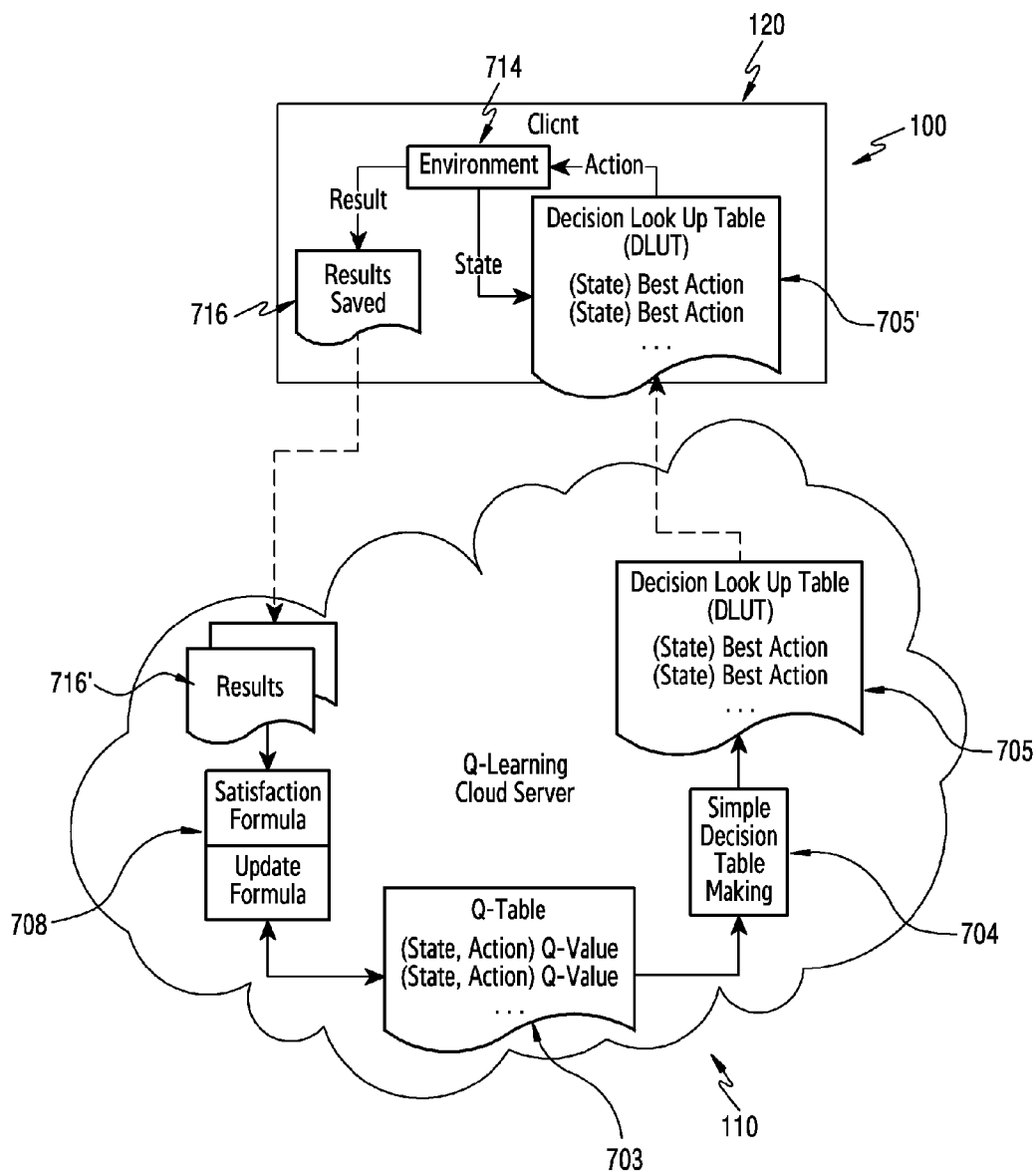

[Fig. 8]
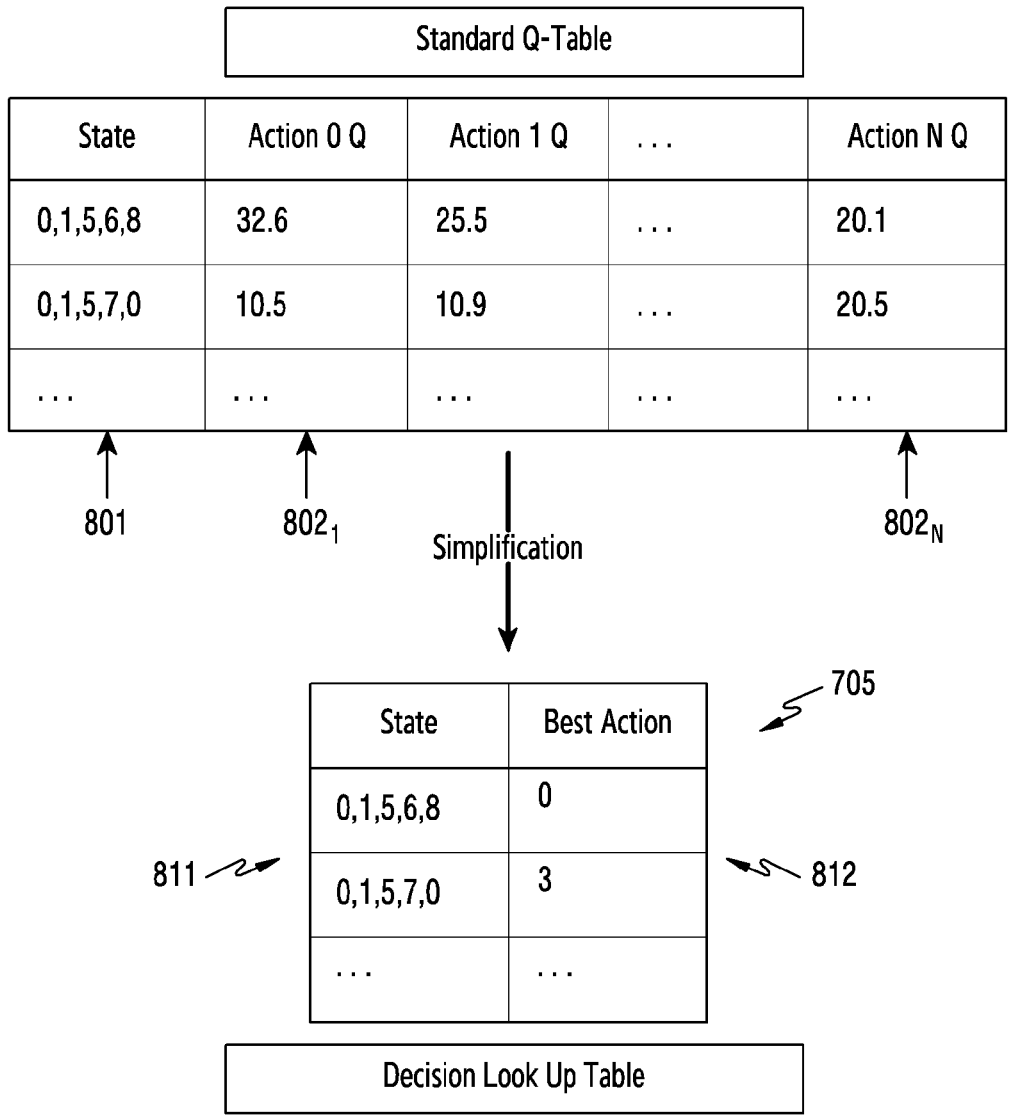

[Fig. 9]
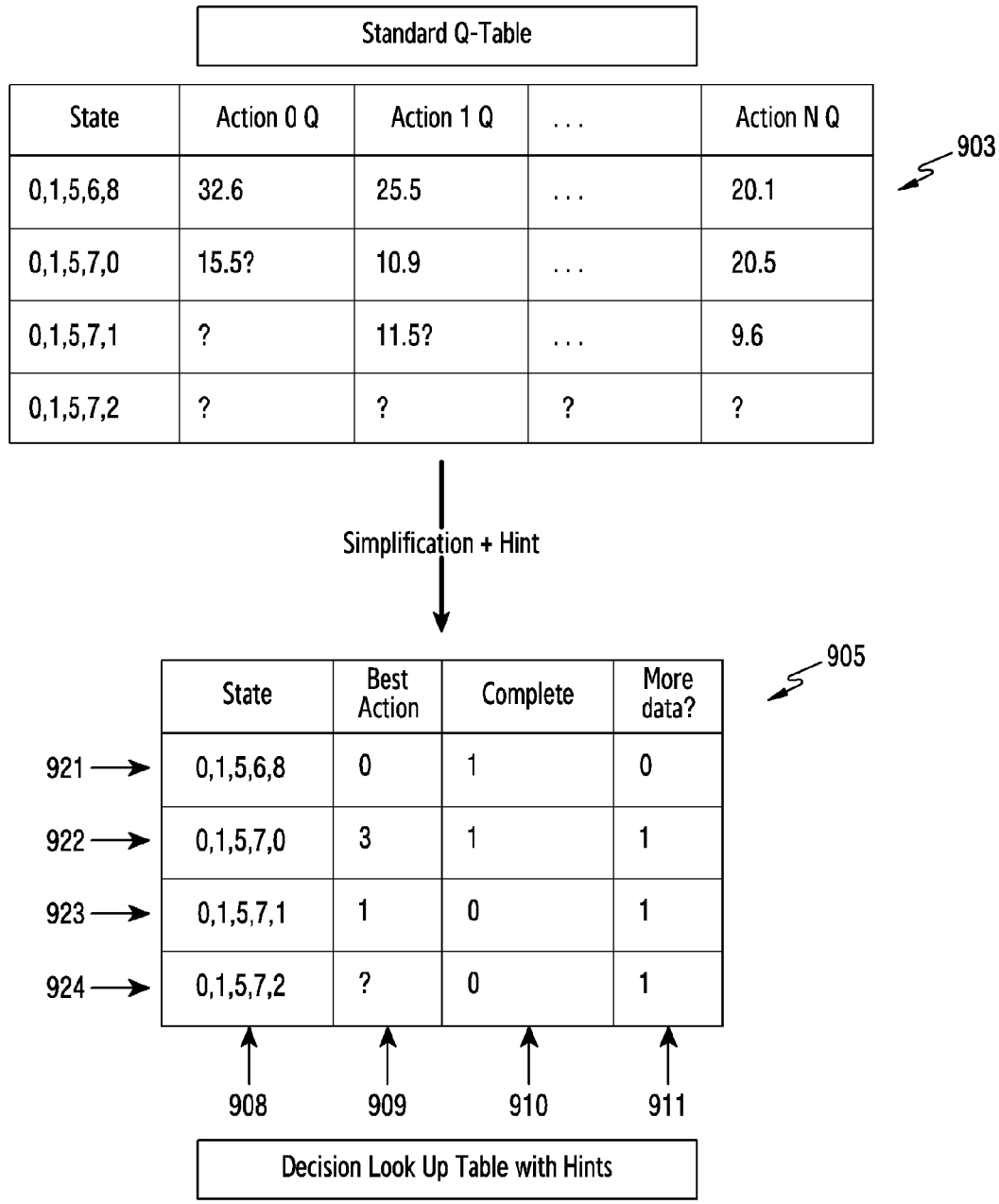

[Fig. 10]
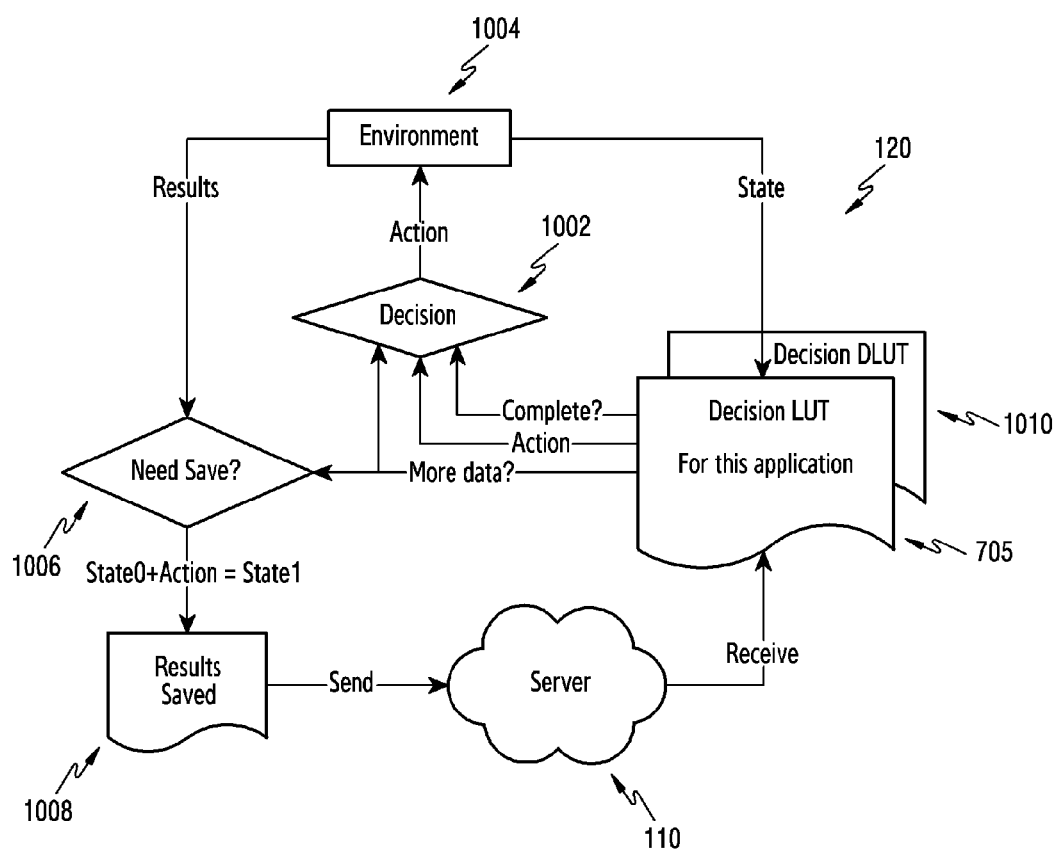

[Fig. 11]
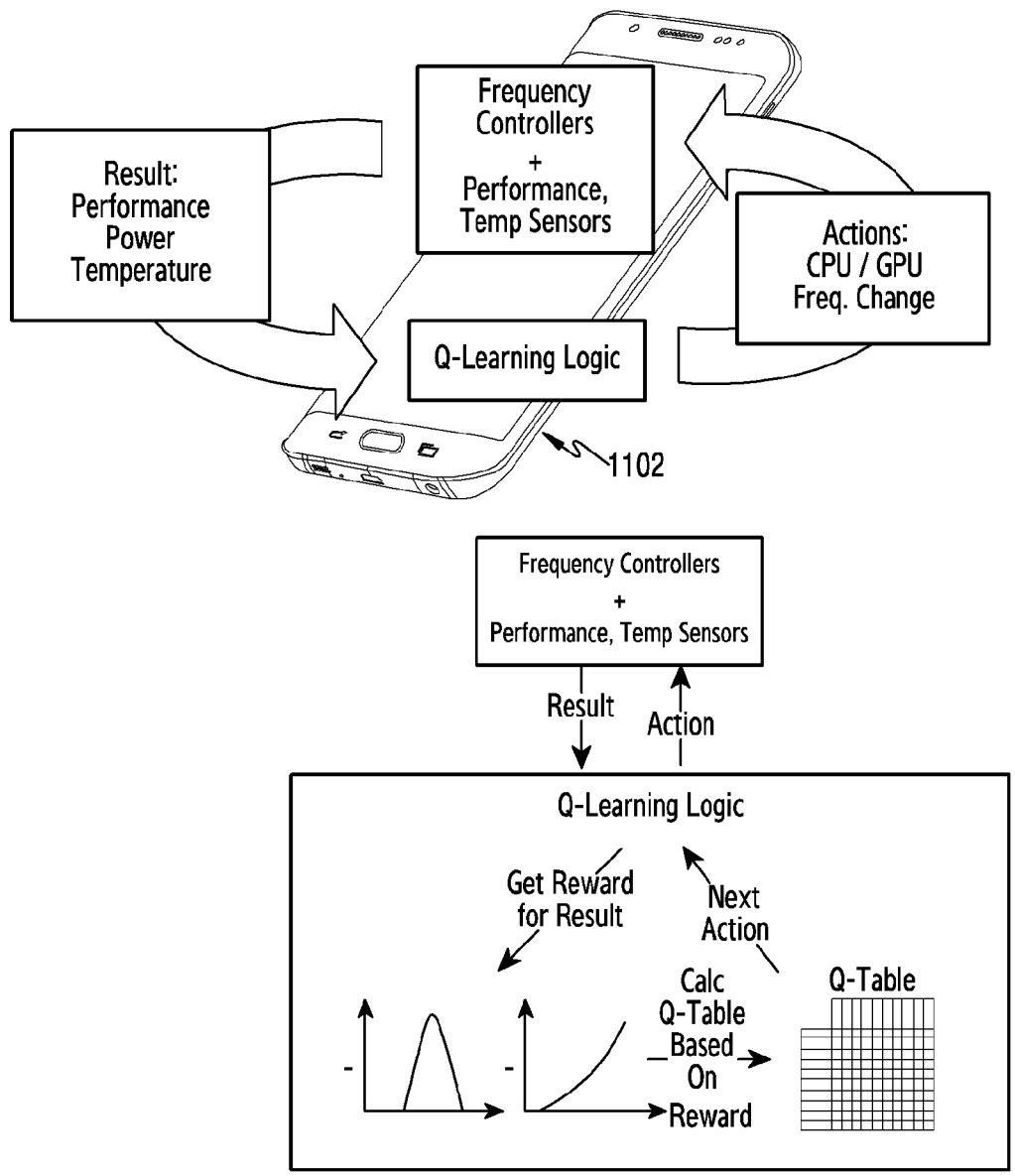

[Fig. 12]
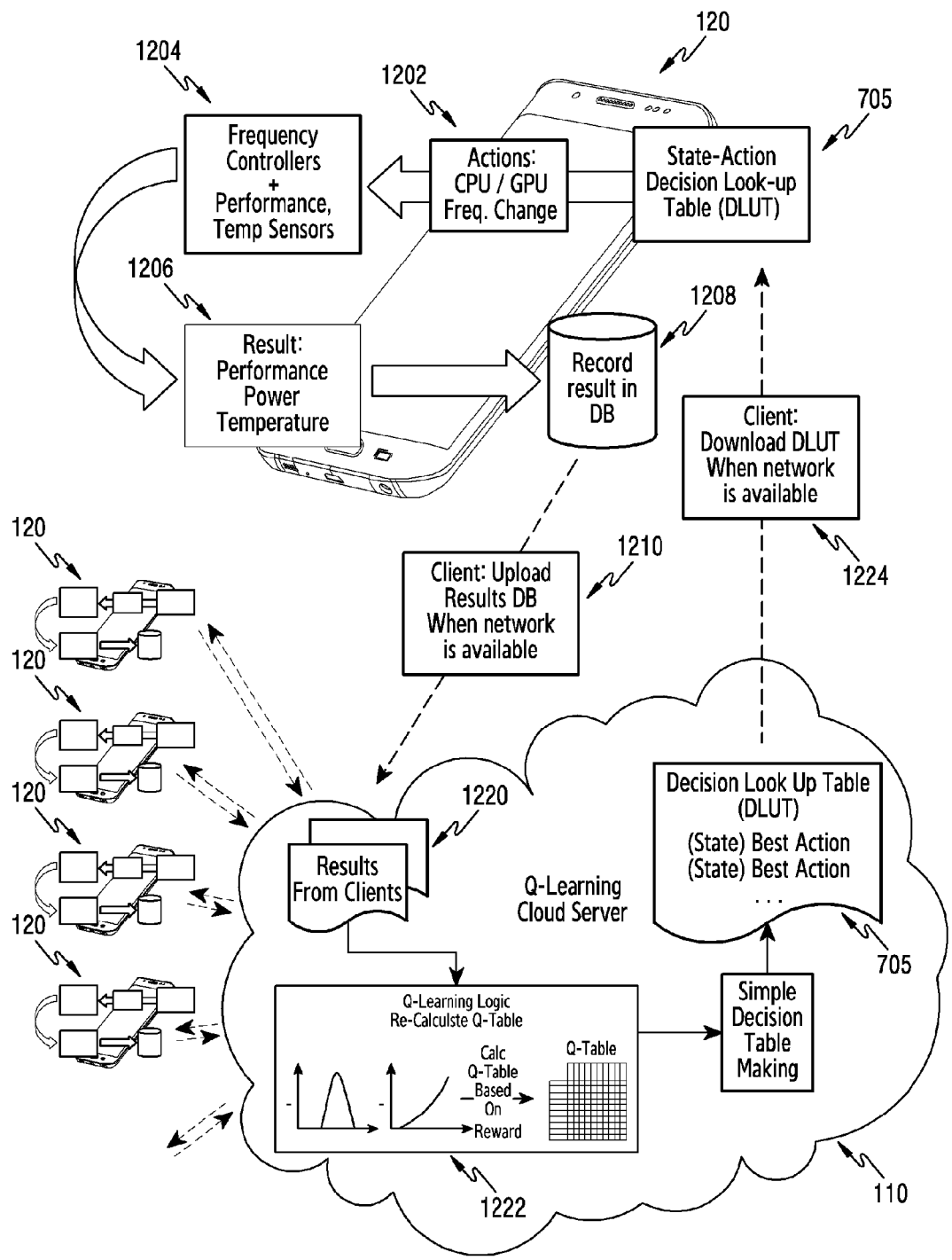

METHOD AND APPARATUS FOR OPERATING AN ELECTRONIC DEVICE BASED ON A DECISION-MAKING DATA STRUCTURE USING A MACHINE LEARNING DATA STRUCTURE

TECHNICAL FIELD

The present disclosure relates to artificial intelligence technologies, more particularly to method and apparatus for automated decision making.

BACKGROUND ART

Artificial Intelligence (AI) system is a computer system that implements human-level intelligence. Unlike conventional Rule-based smart system, AI is a system that learns, judges and becomes smart. As the use of artificial intelligence improves recognition rate and understanding of user's taste more accurately, existing rule-based smart systems are gradually being replaced by deep-based artificial intelligence systems.

Artificial intelligence technology consists of machine learning (deep learning) and element technology that utilizes machine learning.

Machine Learning (ML) is an algorithm technology that classifies/learns the characteristics of input data by itself. Element technology is a technology that simulates functions of human brain such as recognition and judgment using machine learning algorithms such as deep learning, and consists of technical fields such as linguistic understanding, visual understanding, reasoning/prediction, knowledge representation, and motion control.

The various fields in which artificial intelligence technology is applied are as follows. Linguistic understanding is a technology for recognizing, applying/processing human language/characters, and includes natural language processing, machine translation, dialogue system, query response, speech recognition/synthesis, and the like. Visual understanding is a technology for recognizing and processing objects as human vision, and includes object recognition, object tracking, image search, human recognition, scene understanding, spatial understanding, and image enhancement. Reasoning/prediction is a technology for judging information, logically inferring and predicting, and includes knowledge/probability based reasoning, optimization prediction, preference base planning, and recommendation. Knowledge representation is a technology for automating human experience information into knowledge data, and includes knowledge building (data generation/classification) and knowledge management (data utilization). Motion control is a technology for controlling the autonomous travel of the vehicle and the motion of the robot, and includes motion control (navigation, collision, traveling), operation control (behavior control), and the like.

DISCLOSURE OF INVENTION

Technical Problem

The present disclosure provides method and apparatus for automated decision making.

Solution to Problem

According to an aspect of the present disclosure, a method for a first electronic device comprises: generating a decision-making data structure using a machine learning data structure; transmitting, to a second electronic device, the decision-making data structure; receiving, from the electronic device, result data regarding a result of performing a selected action selected from the decision-making data structure; and updating the machine learning data structure using the result data.

According to another aspect of the present disclosure, an apparatus of a first electronic device, the apparatus comprises: a memory storing a machine learning data structure; a transceiver; and at least one processor, wherein the at least one processor is configured to: generate a decision-making data structure using the machine learning data structure, control the transceiver to transmit, to a second electronic device, the decision-making data structure, control the transceiver to receive, from the second electronic device, result data regarding a result of performing a selected action selected from the decision-making data structure, and update the machine learning data structure stored in the memory using the result data.

According to another aspect of the present disclosure, an apparatus of a second electronic device, the apparatus comprises: a memory; at least one sensor; a transceiver; and at least one processor, wherein the at least one processor is configured to: control the transceiver to receive, from a first electronic device, a decision-making data structure, control the at least one sensor to obtain state information on a current state of the second electronic device, select an action from the decision-making data structure using the state information, perform the selected action, and control the transceiver to transmit, to the first electronic device, result data regarding a result of the performing the selected action, wherein the decision-making data structure is generated using a machine learning data structure.

Advantageous Effects of Invention

Various embodiments of the present disclosure provide an improved system performance.

BRIEF DESCRIPTION OF DRAWINGS

FIG. 1 illustrates an automated decision making system according to various embodiments of the present disclosure;

FIG. 2 illustrates the server in the automated decision making system according to various embodiments of the present disclosure;

FIG. 3 illustrates the client device in the automated decision making system according to various embodiments of the present disclosure;

FIG. 4 is a flowchart for operation of the server according to various embodiments of the present disclosure;

FIG. 5 is a flowchart for operation of the client device according to various embodiments of the present disclosure;

FIG. 6 is a flowchart outlining steps performed by a conventional Q-Learning system;

FIG. 7 is a block diagram of an automated decision making system according to an example embodiment, including client devices and a Cloud-based server;

FIG. 8 illustrates example data structures used by embodiments;

FIG. 9 illustrates other example data structures used by embodiments;

FIG. 10 is a flowchart illustrating example steps performed by a client device when implementing an embodiment;

FIG. 11 schematically illustrates operations performed by a known Q-Learning based power management method of a mobile device, and FIG. 12 schematically illustrates operations performed by an embodiment adapted for power management of a mobile device.

BEST MODE FOR CARRYING OUT THE INVENTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Machine Learning (ML) is a type of Artificial Intelligence (AI) that gives computers the ability to learn correct decisions without being explicitly programmed. ML algorithms typically make data driven decisions using a model built from sample inputs. ML is employed in a wide range of fields, such as image/video processing, text/speech recognition, search engines, security, robotics, autonomous vehicles, and many others.

A known type of ML, which is used in applications including Google DeepMind™, Advanced Robotics, etc, is Q-Learning (see, for example, Christopher JCH Watkins and Peter Dayan. *Q-Learning*. Machine Learning, 8(3-4): 279-292, 1992). Q-Learning is based on adaptive ML heuristics and learns based on experience as well as trial and error. A benefit of Q-Learning is that it does not require previously created training data; it is a "decision making" and "updating" ML algorithm that can be used in scenarios requiring a system to automatically learn and self-adjust without a previously generated training set.

Q-Learning takes decisions or "actions" based on previous experiences and selects the best decision in order to reach or get closer to a specific goal. Actions lead to changes in system "states". When there are no experiences, a randomly-selected action is performed. High "rewards" are given to good actions, whilst zero or low value rewards are given to bad actions. Experiences are stored in a data structure called the "Q-Table". The Q-Table is updated when new experiences are gained from the environment. This feedback loop, with rewards and actions, allows the system to "learn".

Unlike other ML heuristics, such as Neural Networks, which are static, Q-Learning can adapt in real time. It also typically uses low CPU resources because updates and decision making are relatively trivial operations.

However, ML algorithms, such as Q-Learning, can be slow and time consuming in some cases. In particular, the learning rate is dependent on the rate at it which it is fed input and on the number of variables involved. ML can be ineffective in some cases because it makes random (or incorrect) decisions when it has low learning or when it is starting out. Further, the learned information data structures/Q-Tables generated can be very large. Learning time is linear to the amount of states in the Q-Table, whilst memory usage is linear to the amount of states in the Q-Table. It is not always feasible to simplify or reduce the Q-Table size (states or actions). Further, if deployed in several independent devices, learning information is not shared.

Distributed Q-Learning is a known variation that solves some of the drawbacks of conventional Q-Learning. Distributed Q-Learning addresses slow learning by using multiple "clients" and learning in parallel. Each client updates a centrally-stored Q-Table asynchronously, thereby decreasing the learning time linearly by the number of clients. Thus, the algorithm learns faster, typically proportional to the number of clients.

However, distributed Q-Learning requires constant communication with a central server that stores the Q-Table in order to function because no Q-Learning is performed by the clients themselves. Therefore, network dropout can cause client devices to become unresponsive. Further, increases in network latency can slow down the client devices' decision making (in some scenarios where decisions are needed in just 10 ms timeframes, a system may even make invalid decisions), and constant network access can be expensive in terms of money, power, etc.

Embodiments of the present disclosure can provide a Cloud-based ML heuristic that learns from multiple, e.g. millions, of devices/sources and can optimize itself and the devices under it. Embodiments can be based on the widely accepted Q-Learning (Reinforcement Learning) Heuristic, or other types of ML. Embodiments may be designed to be lightweight and optimized for Cloud operation, and can also minimize network usage and dependency. Embodiments may be particularly suitable for mobile devices or low power devices.

In example embodiments client devices no longer directly update a full ML data structure, such as a full Q-table, which is stored remotely, e.g. on a server or in the Cloud. Client devices can make decisions using a locally-stored read-only Decision Look-up Table (DLUT), which is a simplified version of the total ML learnt information (i.e. the Q-Table) provided by a remote source, such as the server. In typical embodiments, the client devices do not update the DLUT themselves. Occasionally, e.g. when a network connection is available, the client device may be updated to the latest DLUT version. The server can therefore create the DLUT for the client devices, and also process and add data transferred from the clients into the server's full ML system (Q-Table). The client devices may save the results of executing at least some decisions in a local file/table. When a network connection is available the client devices can transfer at least some of that data to the server/Cloud. These operations can be performed asynchronously while serving an old DLUT version to the clients. DLUT access does not have latency limitations, resulting in faster operation than standard distributed Q-Learning.

Embodiments can reduce training time in a manner that is proportional to the number of client devices. Embodiments may address the large data size problem with ML by storing the full learnt data (Q-Table) remotely (e.g. in a server or the Cloud), and only a device specific "simplified" table may be stored locally in the client device. Embodiments can offer a Cloud based solution that allows for more complex Q-Learning solutions due to fast training time. Training specific to each situation, e.g. power optimisation whilst running a particular software application/game, is possible.

Example embodiments can be applied to power management in mobile devices. Further, embodiments, which can include a Cloud-based self learning infrastructure, may be used to operate many other complex applications, including mobile device applications.

FIG. 1 illustrates an automated decision making system according to various embodiments of the present disclosure. Referring to FIG. 1, the automated decision making system 100 includes a server 110 and at least one client device 120. A client device 120 is a device which is used by a user, and communicates with the server 110 using a communication network.

In the example embodiment, the server 110 is a computer that functions as part of a Cloud service. However, any step described herein as being performed by the server (or any data stored/processed by it) could be performed/stored by other devices via the Cloud. The example embodiment is not a definite limitation and many variations are possible, e.g. the server 110 may comprise a server in connection with one or more (same or different types of) laptop or desktop computers over a wired communications network. Common components of the computers, e.g. user input/output units, etc, are well-known to the skilled person and are not shown or described herein in detail.

The client device 120 may be a terminal, a user equipment (UE), a mobile station, a subscriber station, a remote terminal, a wireless terminal, a terminal, or a user device or other term having equivalent technical meaning. In some cases, the client device 120 is a device that performs machine type communication (MTC) and may not be carried by the user. For brevity, the operations performed by one of the client devices only will sometimes be described below; however, it should be understood that such operations can be performed by any number of client devices and that they can all exchange data with the server.

FIG. 2 illustrates the server in the automated decision making system according to various embodiments of the present disclosure. A structure exemplified at FIG. 2 may be understood as a structure of the server 110. The term "-module", "-unit" or "-er" used hereinafter may refer to the unit for processing at least one function or operation and may be implemented in hardware, software, or a combination of hardware and software.

Referring to FIG. 2, the server 110 may include a transceiver 210, at least one processor 220, and a memory 230.

According to an embodiment, the memory 230 stores a machine learning data structure, and the at least one processor 220 is configured to: generate a decision-making data structure using the machine learning data structure, control the transceiver 210 to transmit, to a client device 120, the decision-making data structure, control the transceiver 210 to receive, from the client device 120, result data regarding a result of performing a selected action selected from the decision-making data structure, and update the machine learning data structure stored in the memory 230 using the result data.

FIG. 3 illustrates the client device in the automated decision making system according to various embodiments of the present disclosure. A structure exemplified at FIG. 3 may be understood as a structure of the client device 120. The term "-module", "-unit" or "-er" used hereinafter may refer to the unit for processing at least one function or operation and may be implemented in hardware, software, or a combination of hardware and software.

Referring to FIG. 3, the client device 120 may include a transceiver 310, at least one processor 320, a memory 330, and at least one sensor 340.

According to an embodiment, at least one processor is configured to: control the transceiver 310 to receive, from a server 110, a decision-making data structure, control the at least one sensor 340 to obtain state information on a current state of the client device 120, select an action from the decision-making data structure using the state information, perform the selected action, and control the transceiver 330 to transmit, to the server 110, result data regarding a result of the performing the selected action. And, the decision-making data structure is generated using a machine learning data structure.

FIG. 4 illustrates a flowchart for operation of the server according to various embodiments of the present disclosure.

According to an embodiment, the operation of the server 110 may comprises: generating 401 a decision-making data structure using a machine learning data structure; transmitting 403, to a second electronic device, the decision-making data structure; receiving 405, from the electronic device, result data regarding a result of performing a selected action selected from the decision-making data structure; and updating 407 the machine learning data structure using the result data.

FIG. 5 illustrates a flowchart for operation of the client device according to various embodiments of the present disclosure.

According to an embodiment, the operation of the client device 120 may comprises: receiving 501, from a first electronic device, a decision-making data structure; obtaining 503 state information on a current state of the second electronic device; selecting 505 an action from the decision-making data structure using the state information; performing 507 the selected action; and transmitting 509, to the first electronic device, result data regarding a result of the performing the selected action, wherein the decision-making data structure is generated using a machine learning data structure.

FIG. 6 illustrates steps typically performed by a conventional Q-Learning process. A computer device, often called an "agent", is configured to perform the Q-Learning process and makes decisions/selects "actions" 602 based on a current state of a system/environment 604 in combination with information stored in a data structure known as the Q-Table 606 that is generated/updated using previous experiences.

As with embodiments of the present disclosure, the "states" and "actions" of the Q-Learning process can vary greatly and should be construed broadly. For instance, a state may relate to the condition of a hardware or software component (which can be internal or external to the agent), e.g. the temperature of a component or outside environment; load of a processor; a value (e.g. a variable used by an application) stored in a register or other data store, and so on. The state may be obtained/computed directly by the agent (e.g. by reading/processing data from its storage), or it may involve use of at least one sensor, network connection, etc. An action may also relate to a hardware or software component, which may be internal or external to the agent. For example, an action may switch on/off a component or device; change a value (e.g. a variable used by an application) stored in a register or other data store; change a device setting (e.g. screen brightness, GPS on/off); move a robot in a particular direction, and so on.

The format of each line/entry in a simple example Q-Table can be as follows:

(State, Action) Q-Value

The Q-Learning process selects the best action based on the current state of the environment with the aim of reaching or getting closer to a specific goal. The action to be selected for a given state may be determined in various ways, e.g. using the known Algorithmic Temperature Function or Boltzmann Probability:

$$\frac{e^{\left(\frac{Q(s,a)}{T}\right)}}{\sum_{b \in A} e^{\left(\frac{Q(s,b)}{T}\right)}}$$

When there are no relevant experiences stored in the Q-Table, a randomly-selected action may be performed.

Performing actions leads to changes in system/environment states. The new state of the system is directly or indirectly the result of the action taken. The Q-Table 606 is updated when new experiences are gained from the environment. A reward value can be calculated for each state based on a satisfaction formula 608. These rewards in effect are determined by the results of a given action. High rewards are given to good results, whilst zero or low rewards are given to bad results. For example, in an AI car driver application, a reward can be based on fuel usage, smooth drive, etc. The satisfaction formula represents the ideal results to be obtained by the system. The update formula 610 updates Q-Values with new data obtained from the satisfaction formula.

Requirements for setting up a Q-Learning system normally include:

1. Define Actions (a)
   (1) Actions are what the agent does in the environment
   (2) Example: Move, sell, buy, update a particular device or application setting, etc.
2. Define Satisfaction or Reward formula (r)
   (1) Rewards indicate if the results are good or bad
   (2) Rewards tell the learning algorithm the outcome of the actions
   (3) Example: Giving a robot positive reward for moving in straight line and a negative reward for hitting the wall; the robot will learn to move in straight line, and avoid walls
3. Define States (s)
   (1) States represent the status of the system at any given time (t)
   (2) Example: Current position in space for a robot, speed of a driving car, etc
   (3) States can also be calculated values; for example average speed of a car, fuel average fuel consumption in a car, battery level of a robot, etc.
4. Define Learning Rate ($\alpha$) and Discount Factor ($\gamma$)
   (1) Learning rate ($\alpha$) will define how quickly an agent learns (longer learning could be more accurate and vice-versa)
   (2) Discount Factor ($\gamma$) defines the importance given to future rewards—Should the agent look for Future high reward or short-term smaller rewards?

An example function for updating the Q-Table is:

$$Q(s_t, a_t) \leftarrow \underbrace{Q(s_t, a_t)}_{\text{old value}} + \underbrace{\alpha}_{\text{learning rate}} \cdot \left( \overbrace{\underbrace{r_{t+1}}_{\text{reward}} + \underbrace{\gamma}_{\text{discount factor}} \cdot \underbrace{\max_a Q(s_{t+1}, a)}_{\text{estimate of optimal future value}}}^{\text{learned value}} - \underbrace{Q(s_t, a_t)}_{\text{old value}} \right)$$

The skilled person will appreciate that the above formula is orientative and that alternative Q-Learning implementations can have multiple different variations of the formula. Provided that the Q-Value of the action gets updated by a suitable formula that uses the reward value obtained, it can still be a Q-Learning implementation.

Embodiments of the present disclosure can be based on modifying the conventional Q-Learning process. However, the skilled person will appreciate that alternative embodiments may be based on other ML techniques, such as Neural Networks, where the inputs can be defined in finite states and there is a limited set of output actions.

FIG. 7 schematically illustrates an example system 100 that can execute embodiments of the invention based on Q-Learning. The example system 100 comprises a first computer, that is, a server 110 and at least one remote computer, that is, at least one client device 120. Each client device 120 can communicate with the server 110 when a functional connection over a communications network exists between the devices, e.g. a wireless internet connection, a cellular network connection, etc.

In known distributed Q-Learning the client devices 120 would communicate with the server 110 in order to obtain Q-Learning decisions based on their current states, and also to transfer result information for updating the Q-Table after taking action. However, in contrast to such conventional Q-Learning systems, in embodiments of the present disclosure the client devices do not directly update the full Q-Table maintained by the server. Rather, the client devices make decisions using a locally-stored decision-making data structure that is derived by the server from the full Q-Table. In some embodiments, this local data structure can comprise a read-only Decision look-up Table (DLUT). Further, the client devices can save result data in a local store (e.g. as a file or table) and at an appropriate juncture, e.g. when a cheap network connection is available (e.g. WiFi™), may transfer the result data to the server in order for it to update its full Q-Table and use that to generate an updated DLUT.

As shown in FIG. 7, the server 110 stores and maintains a full conventional Q-Table 703. From this, a simplification process 704 converts the full Q-Table into a DLUT. This process takes care of finding the best Q-Values and storing only the action related to the best values, as well as some other extra information that might be relevant for client operation. This may be generated by the server itself for every new data acquired from the clients, or batched asynchronously. It can be also performed by at least one remote computing device in communication with the server (e.g. via a Cloud service) and then transferred to the server 110.

FIG. 8 illustrates part of an example of the full Q-Table 703. The Q-Table comprises a first column 801 containing states and at least one further column ($802_1$-$802_N$) representing possible actions that may be taken when in that state and which contain a Q-Value for each action. For example, for the first state (0, 1, 5, 6, 8) the first action involves setting a processor frequency at X MHz, and the Q-Value for that action is 32.6; the second action involves setting a processor frequency at Y MHz and the Q-Value for that action 25.5, and so on.

FIG. 8 also illustrates part of an example DLUT 705 that has been derived from the full Q-Table 703. The example DLUT comprises two columns. The first column 811 contains states and the second column 812 contains an action to be selected (if the client device is in that row's state). The action in each row corresponds to the action in the full Q-Table for that state which has the highest/best Q-Value. For example, in the example full Q-Table of FIG. 8, as the Action0 (in column $802_1$) has the highest Q-Value (32.6) of the row for state (0, 1, 5, 6, 8) then the action for the row of that state (0, 1, 5, 6, 8) in the DLUT is Action0. Thus, each row of the DLUT contains a State→Action pair, and so very simply and efficiently indicates the best action to be taken by the client device for any of the states. Typically, the DLUT is a complete table, not a sparse one, like the Q-Table, and contains an action value for each possible state. This makes the storage of the DLUT simpler since the first column is not needed (states are known in advance and states are listed in ascending or descending order).

The DLUT 705 represents a substantial reduction in size compared to the corresponding full Q-Table 703. The size of the full Q-Table is: $N_{states}*N_{Actions}*Q_{ValueSize}$, with typically the Q-Value size being an integer or floating point value (4 Bytes). In contrast, the size of the corresponding DLUT is:

$$N_{States} * \frac{\log2(N_{Actions})}{8}$$

Thus, the DLUT is, $$\frac{8*N_{Actions}}{\log2(N_{Actions})} * Q_{ValueSize}$$

times smaller.

Advantages can be seen when the DLUT is calculated for a sample Q-Table with 4 Byte Q-Values and 5 Actions: 32× reduction in size; 5 bits/state for Local Look-up Table and 160 bits/state for Full Q-Table.

It will be understood that alternative embodiments can use (one or more) data structures other than look-up tables, preferably simple ones (e.g. arrays or lists) that require little storage and a small amount of processing power in order to obtain/output an action based on (input representing) the current state of a client device 120. For example, in cases where memory might be a problem other structures such as decisions trees can be an in-place replacement to a look-up table. Also, an equivalent mathematical formula, which may cost more computing power but save memory storage, could be used.

Returning to FIG. 7, a copy 705' of the DLUT can be stored locally on the client device 120. The server 110 will transfer the DLUT data to the client device at an appropriate juncture. For example, the server can transfer the DLUT data to the client device immediately/soon after the DLUT has been generated/updated if there is a functional network connection between the server and the client device or only when there is no cost to perform the transfer (network cost, battery cost, etc.). Additionally or alternatively, the DLUT may be transferred periodically; on an event-basis (such as when the client device requests an update); after a functional network connection has been re-established following a disconnection or power off event, etc. The server may transfer the DLUT data to all relevant client devices simultaneously or in batches, etc. The DLUT may be transferred along with additional data, e.g. data identifying the server; data identifying an application related to the Q-Learning; a version number and/or time/date stamp for the DLUT, and so on. Clients may use the extra information to avoid incurring costs when no update is needed.

The client device 120 uses the DLUT 705' to make a decision by selecting/looking-up the action from the DLUT that corresponds to its current state. Executing that action results in a change in the state/environment 714 of the client device. In some embodiments data relating to the result 716 of executing (all or some) actions may be stored locally by the client device. The result data may comprise, for example, an updated state of the client device that resulted from performing the action, as well as data representing the performed action. In some embodiments, the client device may transfer (all or some of) the result data to the server 110 at an appropriate juncture. For example, if there is a functional network connection between the server and the client device or only when there is no cost to perform the transfer (network cost, battery cost, etc.), then the result data may be transferred immediately/soon after the result data has been generated. Additionally or alternatively, the result data may be transferred periodically, in batches (e.g. after X number of results have been generated), and/or on an event-basis, such as when the server requests it; after a functional network connection has been re-established following a disconnection or power off event, etc. The result data transferred may include additional information, such as an identifier of the client device; a version identifier and/or time/date stamp for the DLUT used to generate the results, and so on. The result data may be in any suitable format and may be modified after receipt by the server for further processing.

In some embodiments the server 110 stores a copy 716' of the received result data. The server can use this saved result data to update the full Q-Table, e.g. by means of a software component 708 that executes the satisfaction formula/formula update, at an appropriate juncture. This can be done, for example, immediately upon receipt of the result data; in batches (e.g. after X number of results have been received); periodically; on an event-basis, such as when a user of the server requests it, and so on. In some embodiments the updating software component 708 may be remote from the server, e.g. accessed via a Cloud service.

At an appropriate juncture, the system (e.g. the server 110 and/or other computing devices) may re-generate/update the DLUT 705. For example, this may be done after each update of the full Q-Table 703; periodically; after a certain number of updates to the full Q-Table have been completed; upon request by a software/hardware component, and so on. Thus, the server takes care of creating the DLUT for the client devices, as well as processing and adding the result data from the clients into the server-stored full Q-Table. All of this can be computed asynchronously whilst the client devices can continue to operate using their currently-stored version of the DLUT.

FIG. 9 illustrates part of another example of a full (standard) Q-Table 903, as well as part of an example DLUT 905 that has been derived from the full Q-Table 903 according to another embodiment. In this example DLUT 905, the first column 908 contains states and the second column 909 contains an action to be selected (if the client device is in that row's state). Thus, the first and second columns are substantially the same as the first 811 and second 812 columns of the DLUT 705 of the embodiment shown in FIG. 8. However, this alternative example DLUT 905 of FIG. 9 comprises two additional columns that can be used for offering "hints" intended to add inexpensive intelligence to the DLUT.

In some cases, there may not be enough data for a given state to take a decision as to which action is best. In conventional Q-Learning there is no information regarding whether a state is learned or not. However, some advanced ML techniques can differentiate between unlearned states and learned states by having a counter of how many times a state is visited, as well as recognising empty states by setting all empty states to an empty value. Embodiments can address this shortcoming of conventional Q-Learning by using additional information that indicates whether the data regarding a state is "complete" and/or whether "more data" is needed in order to improve results.

Embodiments can therefore process four "levels" of data completeness/certainty for at least some of the states, including:

1) There is no data for the state (e.g. see row 924 of DLUT 905)
2) There is data, but it is not complete (e.g. row 923)—the ML system is not sure at all whether the action that is considered the best one so far is the real best action possible.
3) There is complete data, but more data is needed (e.g. row 922)—the ML system is quite sure that the best action so far is the overall best action, but more data should be collected to confirm.
4) There is complete data, and more data is not needed (e.g. row 921)

Embodiments can use two additional bits/values in the DLUT 905 in order to indicate which of the above cases 1)-4) apply to the corresponding row of the original full Q-Table 903. An extra action value ("?" in the second column 909 in the example DLUT of FIG. 9) can be used to indicate the "null/no data for this state" case 1). The "Complete" bit/column 910 in the DLUT 905 can be used to indicate whether or not the data is complete for this state. The "More data" bit/column 911 in the DLUT can be used to decide whether or not to save the result, e.g. for transfer to the server for further updating its full Q-Table. In alternative embodiments, it is possible to pack all these bits together in a single value in order to save 1 bit of space. It will also be understood that other data formats/structures can be used to indicate the completeness level of data for each state, i.e. whether the data for the state is complete and/or whether more data is needed for the full Q-Table.

The use of the extra action value can make the table slightly larger, but still small in comparison to the full Q-Table:

$$\frac{8 * N_{Actions}}{\log 2(N_{Actions} + 1) + 2} * Q_{ValueSize}$$

Based on the previous calculation, this still means that the example alternative DLUT is 22.8× smaller.

FIG. 10 is a flowchart illustrating example steps that can be performed by a client device 120. It will be understood that in typical embodiments, several of the client devices can perform these steps independently and communicate with the same server (and/or at least one other server in the same, or different, Cloud service) when necessary. It will also be appreciated that in alternative embodiments, one or more of the steps of the flowcharts herein may be re-ordered or omitted, and/or additional steps may be performed. Further, although the steps are shown as being performed in sequence in the Figures, in alternative embodiments at least some of them may be performed concurrently. Also, embodiments are not limited to certain steps being performed by the particular device/component indicated in the detailed examples. For instance, a server or client device may instruct (or collaborate with) another computer (e.g. via a Cloud service) to perform a particular step or steps. It will also be understood that the methods described herein can be implemented using any suitable programming language/means and/or data structures. In some embodiments, a client device may execute more than one decision-making method, with each method having its own decision-making table/DLUT (and associated server method and full ML data structure). For example, decision-making methods may be provided for optimising more than application running on the client device; optimizing more than one hardware component of (or controlled by) the client device, and so on.

In general, the client device 120 is intended to make the "best" decisions 1002, according to its local DLUT 705 based on its current state/environment 1004, and can also decide 1006 whether or not to store 1008 the result data (typically results relating to new experiences), as will be detailed below. In some embodiments, the "Complete" and "More data" bits in the DLUT can be used to decide whether or not a randomly-selected action is to be taken instead of any action specified in the DLUT for the current state. When a random action is performed it selected from amongst all the possible actions that the system can perform; this data is known a priori by the client as it has to know what the actions mean and how many there are. Thus, the data in the DLUT can affect the randomness of the decision making process. A user/designer of the system can select/modify levels (e.g. X %, Y % probability levels) in order to reduce/minimize the user/system impact of performing random actions, whilst still allowing the system to learn the results of performing new actions when more data is needed.

There are typically four possible client device scenarios that will determine which action to take/decision to make:
  Local DLUT 705 has no data for the current state:
    Perform a random action
    Save the result of performing the random action, e.g. State+Action=Updated state
  Local DLUT 705 has data for the current state, but it is not complete:
    Based on specified X % (e.g. 60%) probability level: perform a random action; otherwise, perform the action stored in the DLUT for the state
    Save the result of performing the selected action, e.g. State+Action=Updated state
  Local DLUT 705 has data for the current state, but more data is needed by the server 110:
    Based on specified Y % (typically lower than X %, e.g. 5%) probability level: perform a random action; otherwise, perform the action stored in the DLUT for the state
    Save the result of performing the selected action, e.g. State+Action=Updated state
  Local DLUT has data for the current state, and more data is not needed:
    Perform the action specified in the DLUT for the state
    Do not save the result of performing the action As discussed above, the client device 120 may transfer the saved result data to the server 110 at an appropriate juncture. The server 110 can then use the result data received by one or more of the client devices to update its full Q-Table. This updating can be done in various ways, e.g. immediately after receiving new result data from any client device; in batches based on all/some client devices; periodically; upon user command/request, etc.

Some embodiments may be adapted to address a "cold-start" problem. Cold-start is when the system has no experience or learning data and needs to learn before making any decisions. Typically during cold-boot, when a client device 120 runs for the first time, there is no existing data. In some embodiments, the client device may use an auxiliary data structure, e.g. a "default" look-up table 1010, to address this problem. The default table can be computed using a hand-made function that decides the best action for a given state or from another source of knowledge. A table can be generated according to a mathematical formula that is known to address some level of the problem the ML has to address; for example, if/else conditions that perform actions based on states. A table can also be generated by reusing data collected for other applications, conditions or devices. When enough data has been collected by the server 110, the default table can also be computed using extrapolation. It is supposed that most of the states in a system will never be explored and therefore it is logical solution to extrapolate the most common data to fill up the table. For example, if the best action when a temperature state of a device is 70° C. is to reduce performance, then the action of reducing performance can be extrapolated to 72° C., 74° C. and all other upper temperature states. A default table is not typically customized for individual applications/situations that are the subject of the ML process.

A default table can only be provided if one is available and so is typically used in cases where the learning system is to specialize. For example, the system may be intended to learn how to play each of several games installed in a phone very well. It could start with a general default table that has training for all games and the system will then train on top of that in order to generate tables that are specialized for each game. However, a default table is not applicable in a case where there is zero training.

As mentioned above, a formula can be used to generate a default table to be used as a solution for cold-start. For example, for a phone client device, formulas can be written to: increase frequency if the processor load is at 100% and decrease otherwise; reduce maximum processor frequency if the temperature is greater than X°, etc. Such formulas will create an initial data set for the server to train and produce a first DLUT. However, the formula must also be used to guide learning; otherwise, the system will never explore past the boundaries of the formula.

Formulas can be written in many different ways. The server may adjust formulas at periodic intervals. For example, an initial formula could be: don't allow increase in processor frequency if temperature is greater than a limit. At a later stage this limit can be changed. This limit can also be different for each device, e.g. for most of the devices the formula may never allow temperature beyond X. However, if that is the case then the system will never beyond temperature X as it never visits states beyond X, and so for a few devices (e.g. 1 in every 1000) it may increase X limit to X+10 (say).

In some embodiments devices are "volunteered" for training, e.g. bits in a DLUT transferred to the devices from the server can indicate whether or not the devices are enabled for unbounded training (for one or more states) or only enabled to run based on formulas. There can also be many variables for these volunteer devices. For example, a device always runs based on formula, but explores for a specific game and only for 10 minutes per day; when its processing load is below a given threshold, and so on. Some embodiments may set and adjust these variables from the server side.

In some embodiments the server may provide specific instructions for training. For example, if an agent/device finds itself in a specific state, taking a specific set of actions, or repeating the same action for a certain time period (e.g. 1) minute before reverting back to formula based control. Based on this, it is possible to expand cold-start to cover more ground.

In use, the client device 120 may be configured to decide when to use the default table 1010 instead of the local DLUT 705, e.g. use the default table for at least one initial iteration of the decision-making process; use the default table when the DLUT contains less than a particular amount of data, e.g. no actions for less a certain number of states; fewer than a certain number of states stored in the DLUT, use the default DLUT when enough random actions have been done lately, and so on.

During a cold-start, or during a new scenario/state not previously encountered, there is a need to reduce the number of sub-optimal actions taken by the client device 120. For example, when a client device encounters unknown states, e.g. when executing a new application, it may perform many random actions. The resulting random behavior can degrade performance, e.g. slow execution of the application itself and/or other software/network issues.

Therefore, some embodiments can set an upper threshold on the number of random decisions to be taken. For example, embodiments may set a maximum, N, number of random decisions during a certain time period (e.g. 100 decisions per hour). In some embodiments random actions are not taken until the number of actions being performed is below a (e.g. user-set) threshold. It will be understood that the selection of random actions may be based on other factors. For instance, the number of random actions may be limited when specific applications/events are being executed by the client device; based on the current load of the client device; and so on. Data containing rules for controlling the number of random actions to be taken can be stored locally by each client device 120. This data may be received from/updated by the server 110 at an appropriate juncture, e.g. at the same time as a DLUT data update; when a new application is installed on the client device; periodically, etc.

FIG. 11 schematically illustrates a known Intelligent Power Management (IPM) approach that is based on Q-Learning. The approach can be used on a mobile device, such as a mobile telephone 1102. The mobile device has a processor and memory that execute/store logic configured to perform power management of the device.

Briefly, the known IPM method of FIG. 11 may comprise obtaining data representing perceived performance of a computer device; executing a power management algorithm that uses at least the data representing perceived performance and data representing current load of the computer device as inputs, and configuring a hardware component of the computer device based on an output of the power management algorithm. The data representing perceived performance represents performance at an end of a processing pipe of the computer device, e.g. an estimate of the performance provided to/experienced by a user running at least one application that is responsible for the load that is processed by the component. The power estimation algorithm can include a Machine Learning process that uses a Q-Table representing the set of states and the set of actions comprising: reading a current state of the computer device/component; choosing and performing an action from the Q-Table based on the current state; checking a result of the action and a feedback or reward parameter; and calculating and updating the state to reflect a new learned relationship between the action and the feedback or reward parameter. The current state of the computer device/component typically includes a state from amongst a set of states comprising FPS, GPU frequency, GPU load, thermal, battery level and/or power usage. The actions are typically selected from a set of actions that include: increasing operating frequency of the component, decreasing operating frequency of the component, maintaining operating frequency of the component or changing operating frequency of the component to a specified value. Goals targeted by the Machine Learning process can include a specific thermal point of the component, a highest possible performance of the component and/or a high load of the component.

The IPM logic of FIG. 11 executing on the mobile device 1102 typically interacts with components such as frequency controllers of the device based on Actions (e.g. increase or decrease CPU or GPU frequency) in order to manage power. The format of an example suitable Q-Table is shown below:

| States | Actions |
|---|---|
| FPS, Load, . . . | Action 1, Action 2, Action 3 . . . |
| FPS, Load, . . . | Action 1, Action 2, Action 3 . . . |
| FPS, Load, . . . | Action 1, Action 2, Action 3 . . . |

In the known method of FIG. 11 the Actions are selected in accordance with conventional Q-Learning techniques using a locally stored full Q-Table based on the current state of the device (e.g. temperature, frames/second and CPU/GPU load). The logic then observes the result of the selected Action, e.g. a change in performance or temperature, and calculates a reward, e.g. a negative reward for low performance/positive reward for high performance. The result is used to update the local Q-Table in a conventional manner. In a typical example, the Q-Table can have around 30,000 table entries. The logic continues to find the next "Best Action" based on values in the local Q-Table depending on its current state, e.g. the best action could be to increase GPU frequency. The logic then repeats these operations in a conventional Q-Learning manner.

The governing equations for some version of the IPM of FIG. 11 can include:

$$\text{For every step} \begin{cases} \text{Decrease } Freq, accum = 0, & f(x) + accum \leq -1 \\ accum \mathrel{+}= f(x), & \text{else} \\ \text{Increase } Freq, accum = 0, & f(x) + accum \geq 1 \end{cases}$$

$$f(P, T, F, G_{Load}) = -w_P \frac{\max(P-1, 0)}{2} - w_T \frac{\max(T-55, 0)^{1.1}}{20} + w_F \frac{(60-F)}{30} + 2*(G_{Load} - 0.9)$$

where P represents power, T represents Temperature, F represents FPS, $G_{load}$ represents load, and w represents configurable "weight" parameters to give more or less importance to the parameters.

Example reward formulas include:

$$P_{Reward}(p) = p$$

$$T_{Reward}(t) = \begin{cases} 0, & t < 65 \\ -\left(\frac{(t_n - 65)^2 * (t_n - t_{n-1})}{10}\right), & t \geq 65 \end{cases}$$

$$FPS_{Reward}(f) = \frac{(f_n - 50)}{30} + \begin{cases} 0.3, & (f_n - f_{n-1}) < -1 \\ 0, & \text{else} \\ -0.3, & (f_n - f_{n-1}) > 1 \end{cases}$$

$$GPU_{LOAD\ Reward}(t) = \sin\left(t * \frac{n}{2}\right) - 0.9$$

$$R(p, t, f, l) = P_R(p) + T_R(t) + FPS_R(f) + GPU_{LOAD_R}(t)$$

However, there are limitations associated with the known IPM method illustrated in FIG. 11. In particular, scalability is an issue. For instance, adding just two new variables (e.g. current draw and battery level) with 10 states each can increase the number of states by more than 3 million. Therefore, a large memory is required for storage (3 Million states→4 bytes per Q-Values*5 Actions (say)*3 Million=60 Mb). Further, training specific to an individual device/application/situation would require a 60 Mb table for each device/application/situation. A large table also results in a long training time. For instance, in one version the training time with 30,000 states is about 4 hours. With 3 million states and training for individual applications the training time would be considerably increased. Further, training is not shared across multiple devices in the known method. Also, due to the speed/storage limitations, it is not practical to perform learning specific to several different applications/situations.

FIG. 12 schematically illustrates an embodiment of a new Q-Learning based approach that can overcome at least some of the limitations of the known power management method of FIG. 11. The method of FIG. 12 can operate using the principles of the general embodiments described above, but is designed specifically for IPM of mobile devices. In a similar manner to the known method of FIG. 11, the embodiment can manage power by setting processor frequency, etc.

Each of a plurality of client devices 120 decides on an Action 1202 (e.g. in the form of setting a processor frequency) based on its current state (e.g. its current CPU/GPU load, FPS, temperature, etc) using a locally-stored DLUT 705. The DLUT contains the best action for all given states as determined by a Q-Learning processed performed by the server 110 in a similar manner to the embodiments described above. Information regarding the current state of the mobile device may be derived from information provided by temperature sensors, etc. Taking the selected Action will result in a new mobile device state 1204 that can have changed performance, power, temperature 1206, etc. These steps can be repeated as appropriate. In some embodiments, each client device can record the result (e.g. the change in performance, temperature, etc) of taking the selected action in a local data store/database 1208. As discussed above, the client device 120 may transfer/upload 1210 the saved result data to the server 110 at an appropriate juncture.

Operations performed by the server 110 include collecting result data 1220 from the client devices 120. The server also recalculates 1222 its full Q-Table based on the received result data at an appropriate juncture, e.g. after a certain amount of result data has been received; periodically; upon request by a software/hardware component, and so on. As discussed above, the server can create a DLUT 705 for each client device and transfer 1224 copies to the client devices.

In some example embodiments, the Q-Table recalculation and DLUT creation can be once per day initially, and then once every couple of days/weeks.

In some embodiments the server/cloud side processing can produce individual Q-Tables for different users/client devices rather than a single Q-Table for use by all users/devices. Training information can be collected from various types of users/client devices and the data processed to find patterns associated with different geographical regions, devices (e.g. phones), applications (e.g. games), etc. For example, there might be different needs depending on the device country; devices in hot countries might learn differently from those located in cold countries. Also, embodiments can support many different devices and so may separate the client devices into categories, even if they all use the same actions/states; the learning might be different due to different behaviour that is learnt by devices having different configurations, locations, user types, etc. Embodiments may use techniques such as the known K-means clustering method to generate common clusters for multi-dimensional data.

Thus, in some embodiments, different ML data structures, such as Q-Tables, and simplified decision-making data structures, e.g. DLUTs, derived from these can be generated and tailored for different uses/situations. Embodiments can identify clusters of client devices based on having data patterns in common. These data patterns may be based on a wide variety of factors, such as location, identify of user, hardware and/or software features and so on. For example, Q-Tables may be generated for different geographical regions. In some embodiments, Q-Tables tailored for individual devices and/or location, OS, application/game and profile can be created and be deployed to all devices/phones when there is a functional internet connection. This level of fine-tuning is not possible/practical with known solutions. If a device, e.g. phone, is not connected to the internet then it can operate using default tables (it may only lack the fine-tuned tables).

In some embodiments, each (or at least some) client device will have different State-Action mappings in its local DLUT. For example, a newer version of a mobile device may have better thermal management and so 600 Mhz frequency GPU runs cooler compared to an older version. The server can produce different Q-Tables and derived DLUTs for each version/release of the device.

In some embodiments, the same client device can have different performance attributes depending on Operating System version. For example, one particular version of Android™ may have fewer background programs and hence require lower frequencies for an application/game compared to another version. Therefore, for the same model of client device the server can produce different Q-Tables and derived DLUTs for different (or even every) Android™ OS versions. As embodiments can provide extremely fast training, such combinations are possible.

In some embodiments, Q-Tables and derived DLUTs tailored to individual applications can be generated, particularly for applications having high processing demands, such as games. This can increase the accuracy of decisions and improve power/performance values. Training data sent to the server can be tagged with specific application/game/package name. This will allow the server to produce one Q-Table/DLUT per application.

Devices are naturally colder in cold countries compared to hot countries. Therefore, embodiments can generate IPM tables specifically to be sent to client devices located in cold countries that allow for higher FPS (as they are cooler devices), whilst a more aggressive FPS throttle may be specified in tables sent to devices in warmer countries.

Due to fast training speed, some embodiments configured to perform IPM can offer more profiles (e.g. 10) than the total number of conventionally supported IPM profiles (e.g. 4—Ultra, High, Mid and Low). Each profile may require training for its own specific FPS, temperature, power target, etc, which can be achieved using embodiments of the present disclosure.

Embodiments can provide layered Q-Learning where a first level comprises a cloud server (that collects the data from users/client devices and creates the Q-Table(s) and DLUT(s)) and a second level comprises user/client devices (which can upload learning to server, downloads new DLUT(s) and operates even offline with already known experience).

Alternative embodiments can operate using generic Q-Learning-like algorithms that operate on a table or similar data structure. Other embodiments can operate using Neural Networks (NN) algorithms or the like, which can be optimized in a similar way. For example, embodiments may use a NN with quantized input levels and quantized output levels as a blackbox equivalent to a Q-Table, so that upon input of states, the NN outputs best actions. For instance, a server device may use a Neural Network/derived data structure (instead of a table) that can provide an output value and a confidence value. A low confidence value can be used to determine that new result data should be recorded and sent to the server. The server can use received result data to re-compute a full neural network data structure and, in some embodiments, generate a neural network derived data structure that is transferred for use by client devices. Embodiments may operate using other types of ML based on graphs/formulas/tables (any type can be converted from one to the other). Embodiments can be produced that provide benefits for any decision-making application/system where ML can be used, including, but not limited to: image/video processing, text/speech recognition, search engines, security, robotics, autonomous vehicles, and so on.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for operating a first electronic device, the method comprising:
generating a decision-making data structure using a machine learning data structure, wherein the machine learning data structure includes data regarding a plurality of states, and data regarding a plurality of possible actions for each of the plurality of states, and the decision-making data structure comprises a look-up table in which each of the plurality of states is mapped with a corresponding action;
transmitting, to a second electronic device, the decision-making data structure different from the machine learning data structure;
receiving, from the second electronic device, result data regarding a result of the second electronic device performing an action that is determined based on the look-up table of the decision-making data structure; and
updating the machine learning data structure using the result data,
wherein the look-up table of the decision-making data structure includes additional information indicating data certainty of each of the plurality of states,
wherein the data certainty is represented by a first value or a second value in the look-up table, the first value indicating that more data to update the machine learning data structure is needed and the second value indicating that more data to update the machine learning data structure is not needed,
wherein the updating the machine learning data structure related to a state is performed when data certainty of the state is represented by the first value in the look-up table,
wherein the look-up table of the decision-making data structure includes a first additional column and a second additional column respectively assigned a level of data completeness and a level of data certainty,
wherein the first electronic device is configured to provide the second electronic device with four levels comprising the level of data completeness and the level of data certainty based on a combination of the first additional column and the second additional column, and
wherein, based on the data certainty of the state being represented by the first value in the look-up table, a randomly-selected action having a first specified probability level or greater is determined to be performed by the second electronic device instead of an action that is mapped to a corresponding state of the plurality of states in the look-up table.

2. The method of claim 1,
wherein the decision-making data structure includes data regarding the plurality of states, and data regarding one action, which is decided as a best action based on a highest Q-value associated with the one action, for each of the plurality of states, and
wherein the data certainty of the state indicates whether more data to update the machine learning data structure of the state is needed to confirm that the decision of the one action as the best action is a correct decision.

3. The method of claim 2,
wherein the machine learning data structure further comprises a Q-table regarding a Q-value associated with each of the plurality of possible actions for each of the plurality of states,
wherein the one action for each of the plurality of states in the decision-making data structure corresponds to an action with a highest Q-value among the plurality of possible actions for each of the plurality of states in the machine learning data structure.

4. The method of claim 1, further comprising generating a plurality of decision-making data structures using a plurality of machine learning data structures,
wherein the plurality of machine learning data structures respectively correspond to a plurality of electronic devices connected to the first electronic device, and
wherein the plurality of decision-making data structures respectively correspond to the plurality of electronic devices connected to the first electronic device.

5. The method of claim 3,
wherein, in the look-up table of the decision-making data structure, each of the plurality of states is mapped with the corresponding action with the highest Q-value.

6. The method of claim 4, wherein the additional information includes a first bit indicating whether a randomly-selected action based on a first specified probability level is to be taken instead of an action that is mapped to a corresponding state of the plurality of states.

7. The method of claim 1, wherein the additional information includes a first bit indicating whether the result data is to be transmitted from the second electronic device, and
wherein the receiving the result data is performed based on a value of a second bit indicating that the result data is to be transmitted from the second electronic device.

8. The method of claim 1, wherein the receiving the result data is performed based on whether there is a functional network connection over a communication network between the first electronic device and the second electronic device.

9. The method of claim 1, wherein the receiving the result data is performed based on a predetermined event, and
wherein the predetermined event includes an update request from the first electronic device.

10. The method of claim 1, further comprising:
updating the decision-making data structure using an updated machine learning data structure;
transmitting, to the second electronic device, the updated decision-making data structure according to a predetermined period; and
receiving, from the second electronic device, updated result data regarding a result of the second electronic device performing an action selected from the updated decision-making data structure.

11. An apparatus of a first electronic device, the apparatus comprising:
a memory storing a machine learning data structure;
a transceiver; and
at least one processor,
wherein the at least one processor is configured to:
generate a decision-making data structure using the machine learning data structure, wherein the machine learning data structure includes data regarding a plurality of states, and data regarding a plurality of possible actions for each of the plurality of states, and the decision-making data structure comprises a look-up table in which each of the plurality of states is mapped with a corresponding action, control the transceiver to transmit, to a second electronic device, the decision-making data structure different from the machine learning data structure, control the transceiver to receive, from the second electronic device, result data regarding a result of the second electronic device performing an action that is determined based on the look-up table of the decision-making data structure, and update the machine learning data structure stored in the memory using the result data, wherein the look-up table of the decision-making data structure includes additional information indicating data certainty of each of the plurality of states, wherein the data certainty is represented by a first value or a second value in the look-up table, the first value indicating that more data to update the machine learning data structure is needed and the second value indicating that more data to update the machine learning data structure is not needed, wherein the at least one processor is configured to update the machine learning data structure related to a state, when data certainty of the state is represented by the first value in the look-up table, wherein the look-up table of the decision-making data structure includes a first additional column and a second additional column respectively assigned a level of data completeness and a level of data certainty, wherein the first electronic device is configured to provide the second electronic device with four levels comprising the level of data completeness and the level of data certainty based on a combination of the first additional column and the second additional column, and wherein, based on the data certainty of the state being represented by the first value in the look-up table, a randomly-selected action having a first specified probability level or greater is determined to be performed by the second electronic device instead of an action that is mapped to a corresponding state of the plurality of states in the look-up table.

12. The apparatus of claim 11,
wherein the decision-making data structure comprises data regarding the plurality of states, and data regarding one action, which is decided as a best action based on a highest Q-value associated with the one action, for each of the plurality of states, and wherein the data certainty of the state indicates whether more data to update the machine learning data structure of the state is needed to confirm that the decision of the one action as the best action is a correct decision.

13. The apparatus of claim 12,
wherein the machine learning data structure further comprises a Q-table regarding a Q-value associated with each of the plurality of possible actions for each of the plurality of states, wherein the one action for each of the plurality of states in the decision-making data structure corresponds to an action with a highest Q-value among the plurality of possible actions for each of the plurality of states in the machine learning data structure.

14. The apparatus of claim 11,
wherein the at least one processor is configured to generate a plurality of decision-making data structures using a plurality of machine learning data structures, wherein the plurality of machine learning data structures respectively correspond to a plurality of electronic devices connected to the first electronic device, and wherein the plurality of decision-making data structures respectively correspond to the plurality of electronic devices connected to the first electronic device.

15. The apparatus of claim 13,
wherein, in the look-up table of the decision-making data structure, each of the plurality of states is mapped with the corresponding action with the highest Q-value.

16. An apparatus of a second electronic device, the apparatus comprising:
a memory;
at least one sensor;
a transceiver; and
at least one processor,
wherein the at least one processor is configured to:
control the transceiver to receive, from a first electronic device, a decision-making data structure generated by the first electronic device, wherein:
the decision-making data structure is generated using a machine learning data structure different from the decision-making data structure, the machine learning data structure comprising data regarding a plurality of states, and data regarding a plurality of possible actions for each of the plurality of states, and
the decision-making data structure comprises a look-up table in which each of the plurality of states is mapped with a corresponding action,
control the at least one sensor to obtain state information on a current state of the second electronic device,
determine an action based on the look-up table of the decision-making data structure using the state information,
perform the determined action, and
control the transceiver to transmit, to the first electronic device, result data regarding a result of the performing the determined action,
wherein the look-up table of the decision-making data structure includes additional information indicating data certainty of each of the plurality of states, and
wherein the data certainty is represented by a first value or a second value in the look-up table, the first value indicating that more data to update the machine learning data structure is needed and the second value indicating that more data to update the machine learning data structure is not needed,
wherein the transceiver is configured to receive, from the first electronic device, an updated decision-making data structure related to a state, when data certainty of the state is represented by the first value in the look-up table,
wherein the look-up table of the decision-making data structure includes a first additional column and a second additional column respectively assigned a level of data completeness and a level of data certainty,
wherein the first electronic device is configured to provide the second electronic device with four levels comprising the level of data completeness and the level of data certainty based on a combination of the first additional column and the second additional column, and
wherein, based on the data certainty of the state being represented by the first value in the look-up table, a randomly-selected action having a first specified probability level or greater is determined to be performed by the second electronic device instead of an action that is mapped to a corresponding state of the plurality of states in the look-up table.

17. The apparatus of claim 16,
wherein the decision-making data structure comprises data regarding the plurality of states, and data regarding one action, which is decided as a best action based on a highest Q-value associated with the one action, for each of the plurality of states,
wherein the data certainty of the state indicates whether more data to update the machine learning data structure of the state is needed to confirm that the decision of the one action as the best action is a correct decision.

18. The apparatus of claim 17,
wherein the machine learning data structure further comprises a Q-table regarding a Q-value associated with each of the plurality of possible actions for each of the plurality of states,
wherein the one action for each of the plurality of states in the decision-making data structure corresponds to an action with a highest Q-value among the plurality of possible actions for each of the plurality of states in the machine learning data structure.

19. The apparatus of claim 18,
wherein the at least one processor is further configured to control the transceiver to receive, from the first electronic device, an updated decision-making data structure generated by the first electronic device, and
wherein the updated decision-making data structure is generated, using the machine learning data structure that is updated based on the result data.

20. The apparatus of claim 18,
wherein, in the look-up table of the decision-making data structure, each of the plurality of states is mapped with the corresponding action with the highest Q-value.

* * * * *